June 21, 1966     J. L. CARROLL     3,257,019
VEHICLE TOP CARRIER
Filed Dec. 28, 1964     4 Sheets-Sheet 1
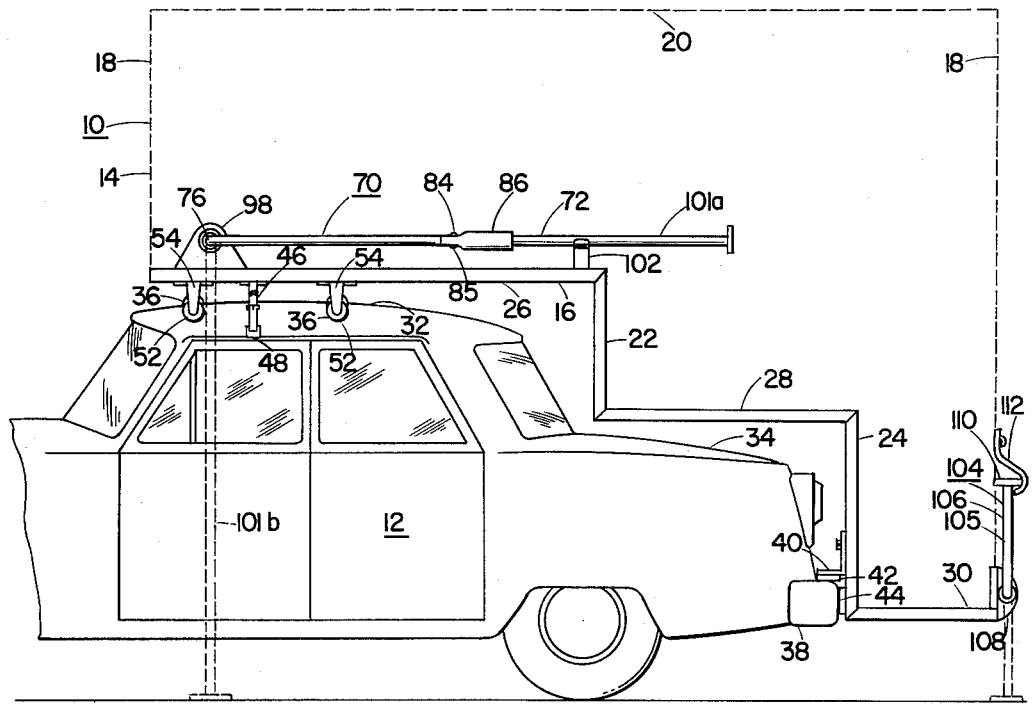
FIG. 1
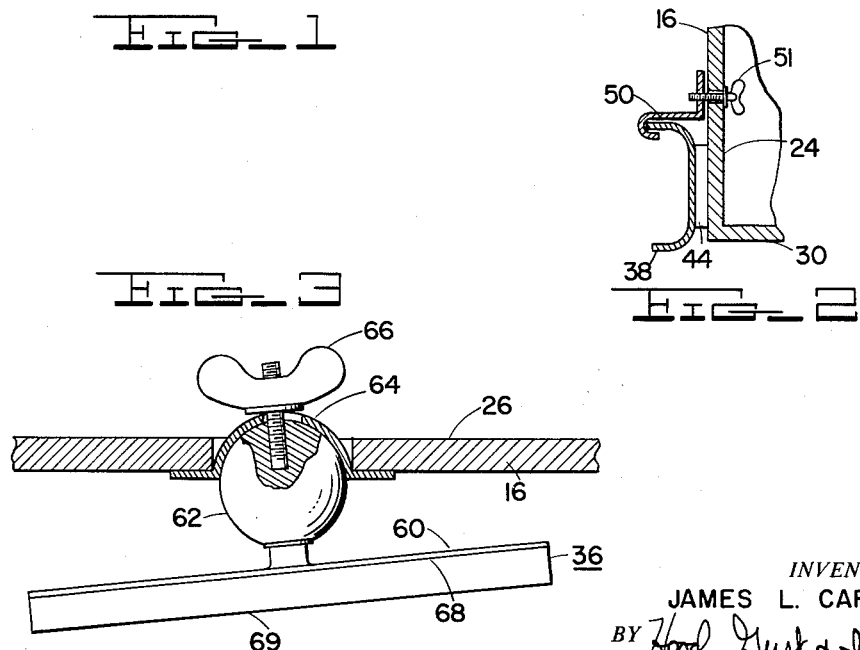
FIG. 2
FIG. 3
INVENTOR.
JAMES L. CARROLL
BY Hood, Gust & Irish
ATTORNEYS

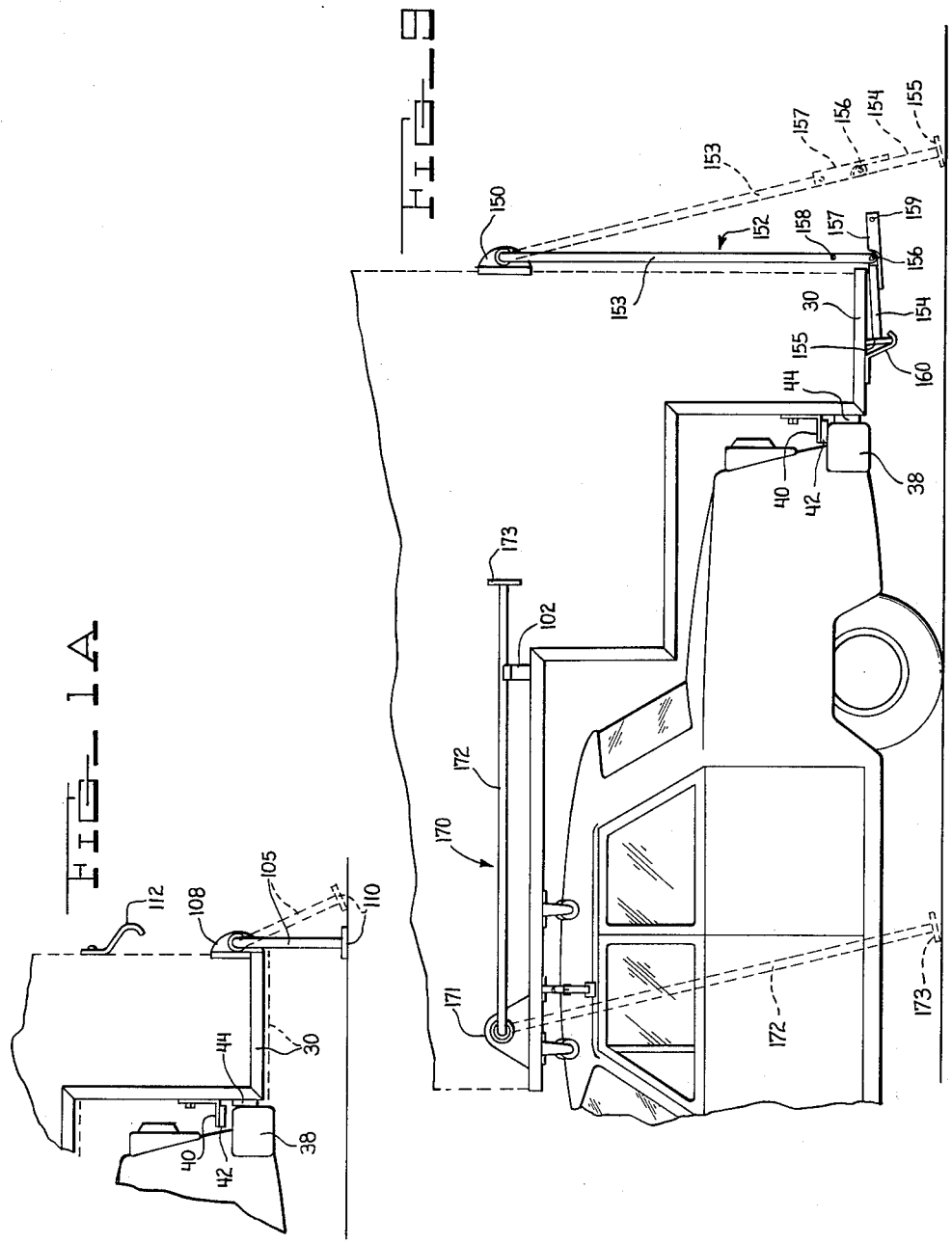

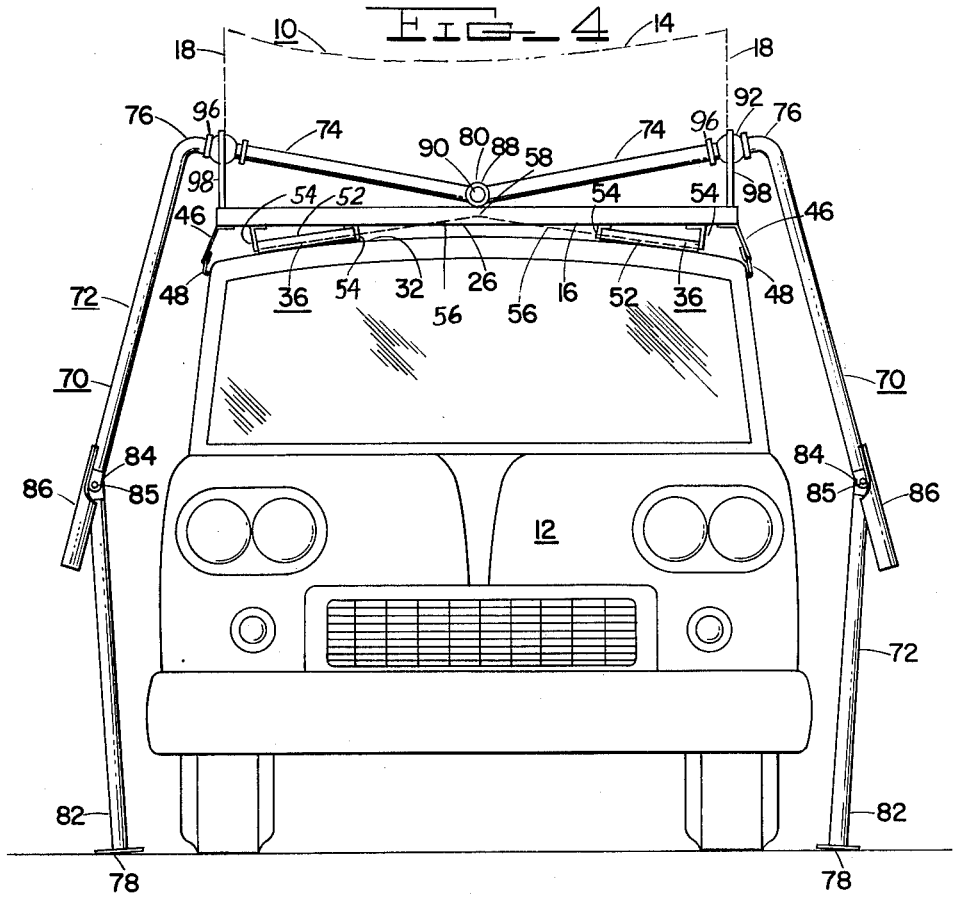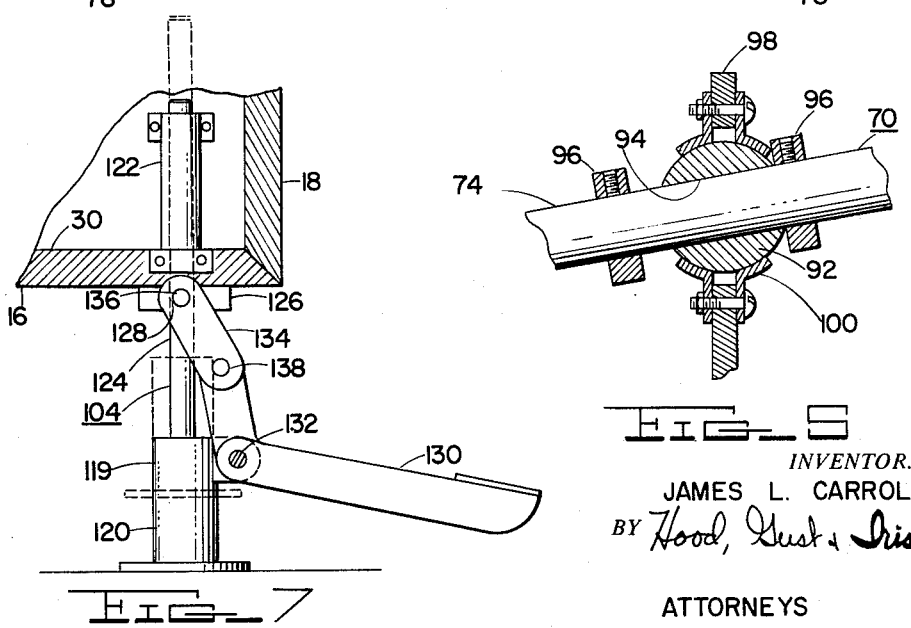

June 21, 1966   J. L. CARROLL   3,257,019
VEHICLE TOP CARRIER
Filed Dec. 28, 1964   4 Sheets-Sheet 4
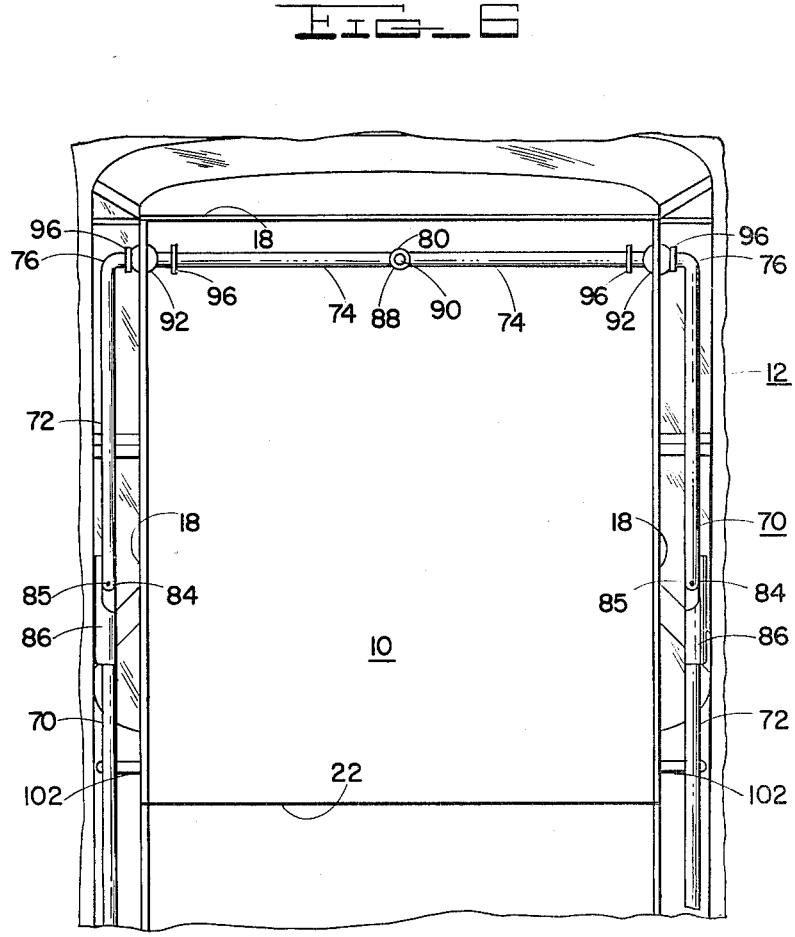
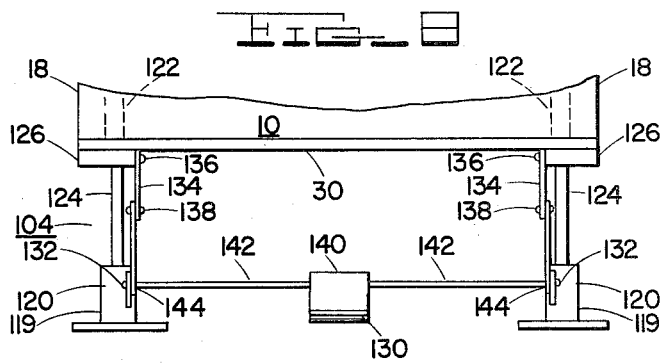
INVENTER
JAMES L. CARROLL
BY Hood, Gust, Irish
ATTORNEYS

# United States Patent Office 3,257,019
Patented June 21, 1966

3,257,019
VEHICLE TOP CARRIER
James L. Carroll, Indianapolis, Ind., assignor to Wilco Corporation, Indianapolis, Ind., a corporation of Indiana
Filed Dec. 28, 1964, Ser. No. 421,487
6 Claims. (Cl. 214—515)

The present invention relates to a vehicle top carrier, and more particularly, to a carrier which can easily be mounted on and demounted from a vehicle to provide the vehicle with additional usefulness.

The primary purpose of this invention is to provide a vehicle top carrier which can be easily mounted on and demounted from a vehicle by a single person.

Another object of this invention is to provide a vehicle top carrier which can be mounted and demounted from a vehicle without substantially changing its position relative to the ground thereby allowing objects which are not fixed to the carrier to permanently remain therein.

A further object of the invention is to provide a vehicle top carrier which can be lifted from a supported position on top of a vehicle to a self-supporting position from which the vehicle may be driven away, without the use of external power.

It is still another object of this invention to provide a vehicle top carrier which has a lateral dimension smaller than the width of a vehicle and which is supported by retractable legs in a manner such that the vehicle can be driven beneath the carrier and attached thereto and detached therefrom.

A further object of this invention is to provide a vehicle top carrier having the aforementioned advantages which is large enough to be outfitted as a camping rig with a full size bed over the top of the vehicle and with a space over the rear portion of the vehicle having standing-room height in which other camping facilities may be placed.

Further object of this invention will appear as the description proceeds.

To the accomplishement of the above and related objects, my invention may be embodied in the forms illustrated in the accompanying drawings, attention being called to the fact, however, that the drawings are illustrative only and that change may be made in the specific constructions made and illustrated and described as long as the scope of the appended claims is not violated.

In the drawings:

FIG. 1 is a fragmentary side view of a vehicle with a carrier of this invention mounted thereon illustrating one means by which the front end of the carrier can be supported by the top of a vehicle and showing the supporting legs of the carrier in retracted position in solid lines and the outline of the carrier body and the position of the supporting legs in carrier-supporting position in dashed lines;

FIG. 1A is a fragmentary view of a portion of the structure shown in FIG. 1, illustrating the mode of operation of the rear leg means of that form of the invention;

FIG. 2 is a fragmentary and cross-sectional view of the rear bumper of a vehicle and the means by which the rear portion of the carrier of this invention is secured thereto;

FIG. 3 is a fragmentary and cross-sectional view of a second means by which the front end of the carrier of this invention can be supported by the top of a vehicle;

FIG. 4 is a front view of a vehicle having the carrier of this invention mounted thereon and supported at the front end thereof by the means illustrated in FIG. 1; and further illustrating the jack-knife position of the front leg structure which permits the legs to be spaced from the vehicle sides during the mounting and demounting of the carrier and the vehicle to be driven beneath the carrier;

FIG. 5 is a fragmentary, partially cross-sectional and enlarged view of the means by which the front leg structure is swivelly attached to the sides of the carrier of this invention;

FIG. 6 is a fragmentary top view of the carrier of this invention and the vehicle on which it is mounted;

FIG. 7 is a fragmentary and cross-sectional view of another type of support for the rear portion of the carrier of this invention comprising a jack illustrated in carrier-supporting position in solid lines and in a retracted position in dashed lines;

FIG. 8 is a fragmentary rear view of the carrier of this invention, demounted from the vehicle, and supported by the jacks illustrated in FIG. 7 at opposite rear corners of the carrier body, and further illustrating the linkage by which both jacks may be actuated by a common foot pedal, and FIG. 9 is a view similar to FIG. 1 but illustrating a modified arrangement of leg means whereby the carrier may be lifted from the vehicle and to a self-supporting position without the use of any external power.

In the broader aspects of this invention, there is provided a vehicle top carrier comprising a carrier bottom and at least two opposite upstanding sides to which is secured a first means having surfaces defining generally a shape conforming to the top of the vehicle for supporting one end of the carrier by a vehicle top, a pair of legs connected at one end thereof having means allowing the legs to move jointly from a retracted position to a carrier-supporting position in which the carrier is spaced-apart from the top and sides of the vehicle, and a second means for selectively supporting the other end of the carrier bottom on the vehicle when said legs are in the retracted position and independently of the vehicle when the legs are in the carrier-supporting position.

Referring now to the drawings, and more specifically to FIGS. 1, 1A and 4, there is shown the vehicle carrier 10 having a carrier body 14 which is mounted on a vehicle 12. The carrier body 14 comprises a carrier bottom 16, upstanding sides 18, and a top 20, the sides and top being depicted by dashed lines showing the general outline thereof. Carrier bottom 16 is stepped at 22, 24 so as to conform generally to the exterior shape of the vehicle 12 and provide substantially horizontal portions 26, 28 and 30. Mounted as illustrated, portion 26 overlies the vehicle top 32, portion 28 overlies the trunk lid 34, and portion 30 extends rearwardly of the vehicle 12. Secured to the portion 26 of bottom 16 and depending therefrom is a plurality of supports 36 which contact the top 32 of the vehicle 12 and thereby support the portion 26 of bottom 16 thereon. The supports 36 are spaced-apart from each other and support the section of portion 26 adjacent the front end of the carrier body 14. Supports 36 have surfaces which are in contact with the top 32 and which when combined with the surfaces of the other supports 36 generally define a shape conforming to the top 32 of the vehicle 12 and thereby adapt the body 14 to be supported on vehicle 12. The rear portion of the carrier 10 is supported by the bumper 38 of the vehicle 12 by means of a bracket 40 secured to the step 24 and on which a a pad 42 is fixed that engages the top surface of the bumper 38. Adjacent thereto is another pad 44 secured to the step 24 which engages the rearwardly facing surface of the bumper 38. By means of the supports 36 and the brackets 40 the weight of the vehicle carrier 10 is fully borne by the vehicle 12 at the top 32 and the bumper 38 thereof.

In order to secure the carrier 10 to the vehicle 12 and to insure that movement will not occur therebetween, two means are provided. The first of these are straps 46 which are connected to opposite sides of portion 26 and depending therefrom and which have hooks 48 at their distal end. By engaging the hooks 48 with the drain gutters which conventionally run lengthwise of the automobile above the doors and tightening the straps 46, movement between the carrier 10 and the vehicle 12 can be resisted. Such movement is practically eliminated when the second means illustrated in FIG. 2 is also used. This second means comprises a hook-bracket 50 secured to the step 24 of the bottom 16 in the approximate position of and on either side of the bracket 40. Each hook-bracket 50 is movable toward and away from step 24 by means of a screw 51. By engaging the hook-bracket 50 with the inwardly facing upper end of the bumper 38 and tightening the screw 51, the bumper 38 may be held securely against the pads 44 thereby further resisting any movement between the carrier body 10 and the vehicle 12. Secured by these means, carrier body 10 is fastened to the vehicle 12 in such a manner that it can be transported by the vehicle 12.

Two different embodiments of the supports 36 are shown in the drawings. First of these is illustrated in FIGS. 1 and 4 and comprises an elongated and cylindrical roller 52 supported at both ends of brackets 54 adjacent one side of bottom portion 26 and which has an axis of revolution 56 which if extended intersects portion 26 in a central position and the axis 56 of another roller secured adjacent the opposite side of portion 26 at a point 58. Rollers 52 are mounted on bottom 16 adjacent the opposite sides 18 of carrier body 14 in a position such that each pair of intersecting axes 56 define planes which are both perpendicular to bottom 16 and the sides 18 and which are spaced-apart and parallel to each other. The second embodiment of supports 36 is illustrated in FIG. 3 and comprises a foot 60 which is swively supported on the portion 26 by means of a ball 62 secured to foot 60 and a socket 64 secured to portion 26. Threadedly received into ball 62 is a screw 66 which allows the balls 62 to be rigidly secured in the socket 64 and the foot 60 to the bottom 16. Foot 60 has a planar surface 68 to which a pad 69 is secured. Feet 60 are selectively movable to allow the surfaces 68 to conform generally to the shape of top 32 of the vehicle 12 and are selectively securable to the bottom 16 by means of screw 66.

In order to easily mount and demount the carrier from the vehicle 12 and to store the carrier 10 in a position substantially the same as it is when mounted on vehicle 12, there are provided legs which are secured adjacent the corners thereof. A first pair of legs indicated generally by the reference numeral 70 comprises two portions 72, 74, each of which are straight and are joined in end to end relationship at an elbow 76, thereby defining distal ends 78, 80 of the portions 72, 74 respectively. Each leg portion 72 has a base plate 82 secured to end 78 generally perpendicularly to the longitudinal axis thereof and is hinged intermediate elbow 76 and end 78 at joint 84. Hinged joint 84 has an axis of rotation 85 which is generally horizontal and extends generally longitudinally of the carrier 10 and the vehicle 12 when the carrier 10 is in the aforementioned mounted position. Secured to portion 72 adjacent joint 84 and on one side thereof is a means 86 by which the movement of the portion 72 about axis 85 is limited to one hundred eighty degrees. Leg portions 74 are hingedly secured together at ends 80 by a hinged joint 88 thereby forming a U-shaped leg structure of the two legs 70. Hinged joint 88 has an axis of revolution 90 which is parallel to the axis of joints 84.

A pair of balls 92 having diametral openings 94 therethrough are slidably positioned on portions 74 adjacent elbows 76, respectively. The position of balls 92 on portions 74 is more clearly shown in FIG. 5. A pair of washer-like elements 96 are rigidly secured to portions 74 on both sides of balls 92, respectively, to limit the sliding movement of the portions 74 diametrically of balls 92. Legs 70 are secured to carrier 10 by securing the balls 92 to the carrier 10 by means of brackets 98 which are secured to the opposite sides 18 and to the bottom 16 adjacent the opposite corners of the front end of carrier body 14. Brackets 98 have a socket 100 secured thereto into which balls 92 fit and are swively movable. This securance of the balls 92 to the carrier 10 positions balls 92 in spaced-apart relation with the bottom 16 and the leg portions 74 between the balls 92 within the body 14 of the carrier 10. Mounted in this manner, legs 70 are movable at joints 84 from a position in which portions 72 are straight and aligned on both sides of joint 84 away from each other to a jack-knife position illustrated in FIG. 4. Legs 70 are also swively movable about the centers of balls 92 from a retracted position 101a in which the legs 70 are substantially horizontal and held to the sides 18 of carrier 10 by means of brackets 102, as shown in solid lines in FIG. 1, to a substantially vertical position 101b shown in dashed lines in FIG. 1. Further, the leg portions 72 are laterally movable toward and away from each other and the sides 18 of body 10 by the sliding of portions 74 through the opening 94 of the balls 92. This lateral movement is always accompanied by hinged movement between the leg portion 74 at the joint 88. By the provision of the swivel and lateral movement of the legs 70 aforedescribed, sides 18 of the carrier 10 can be spaced apart a distance which is less than the lateral dimension of vehicle 12 without preventing the legs 70 from being moved into the substantially vertical position 101b.

Further, legs 70, being connected in a manner above described, are movable together as a pair by merely moving one of the legs 70, as the movement of one will cause a corresponding movement in the other. Exemplary of this corresponding movement is the fact that when the portion 72 of one of the legs 70 is placed in the aforementioned straight and aligned position the other leg will assume the same position; that when one leg 70 is moved from the position 101b to the position 101a illustrated in FIG. 1, the other leg 70 will move in a like manner; and that when one of the legs 70 moves laterally of the sides 18, the other will also. Generally, it may be said that the corresponding movement of the leg 70 will be a movement in the same direction when the movement is a swivel movement in planes parallel to the axis 84, 90, and will be movements in opposite directions when the movement involves a hinged movement.

Secured adjacent the rear end and the rear corners of carrier body 14 are legs 104, respectively. Two embodiments of legs 104 are illustrated. The first embodiment 105 is illustrated in FIG. 1 and comprises a rod 106 which is hingedly secured at one end to the carrier body 14 by means of a bracket 108 and which has secured at the other end a foot 110. Leg 105 is shown in solid lines in FIG. 1 in its retracted position in which rod 106 is substantially vertical with feet 110 held against rear side 18 by means of a clamp 112.

With this arrangement, when it is desired to dismount the carrier form the vehicle, the leg means 104 is detached from the clamp 112 and is swung to its broken-line position of FIG. 1A. Now, the securing means 46, 48 and 50 will be released, and the vehicle will be driven gently backward. The feet 110 will dig slightly into the ground (or, if necessary or desired, they may be blocked in any suitable way against rearward movement) and as the vehicle bumper 38 pushes against the pad 44, the leg means will turn about its journal axis in the brackets 108 to lift the rear end of the carrier to its solid-line position of FIG. 1A as the leg elements 105 assume a vertical position. Now, the leg means 70 will be moved to the position of FIG. 4; and when inward force is exerted against the extensions 86, the leg portions 72 will be straightened to lift the front end of the carrier correspondingly by toggle action.

Now the carrier is in self-supporting condition, and the vehicle may be freely driven away.

The second embodiment of the legs 104 which can be used with the carrier 10 of this invention is illustrated in FIGS. 7 and 8. This embodiment 119 of the rear leg means 104 comprises a pair of jacks each including a pedestal 120 having a reduced, upstanding rod or post 124 which is reciprocably guided in a tube 122 suitably secured to the carrier frame adjacent a side wall 18. A shaft 142 is journalled at 132 in a suitable bearing on each pedestal 120 and a foot lever 130 is fixed to said shaft approximately midway between the two jacks and carries a pedal 140. A lever 144 is fixed to the shaft adjacent each jack, and the distal end of each such lever 144 is pivoted at 138 to one end of a link 134, the other end of each such link being pivoted at 136 to a block 126 which is slidable on the post 124 and may be fixed to the carrier frame, each block being formed with a stop surface limiting counter-clockwise movement of the link 134 about its pivot 136 to the position shown. Thus, as the pedal 140 is depressed to its illustrated position, the pedestals 120 will be moved downwardly relative to the carrier frame and the carrier frame will be lifted by toggle action off the vehicle. When the pedal 140 is lifted, the toggles will be broken, the carrier will be lowered onto the vehicle, and the pedestals 120 will be lifted out of contact with the ground.

By means of legs 70 and 104, the carrier 10 can be supported at a height sufficient to allow clearance between the supports 36 and the vehicle top 32 thereby allowing the vehicle 12 to be driven beneath the carrier 10 and placed in relative position to carrier bottom 16 shown in FIG. 1. Legs 70 can then be placed in the jack-knife position illustrated in FIG. 4 thereby lowering carrier 10 onto the top 32 of vehicle 12 after which the straps 46 and the clamp-brackets 50 can be attached to the vehicle 12 securing the carrier 10 in place. By positioning the legs 70, 104 in retracted position, the carrier 10 is completely mounted on the vehicle 12 and can be transported about by the vehicle 12.

In FIG. 9, I have shown a modified form of means for lifting the carrier from the vehicle which, in some ways, is simpler and more effective than the previously described forms. According to this embodiment of the invention, leg means indicated generally by the reference numeral 170 is associated with the front end of the carrier and may be in all respects identical with the above described leg means 70 except that the dependent portions 172 are rigid and unjointed. Each such portion is provided with a foot 173 at its distal end, and the portions 172 may be supported in the solid line position of FIG. 9 by means of the bracket 102 during transit.

The rear leg means 104 of FIG. 1 is replaced, in this embodiment of the invention, by leg means indicated generally by the reference numeral 152 and comprising a transverse rod journalled in brackets 150 at the rear end of the carrier, and dependent elements each consisting of an upper section 153 and a lower section 154 hinged, at a level just below the frame element 30, upon horizontal, transverse axes 156. Each section 154 is provided with a foot 155 at its distal end and with a semi-cylindrical extension 157 at its proximal end. The section 153 is formed with a transverse perforation 158 and the extension 157 is formed with registering perforations 159 which, when the dependent elements are in straightened condition as shown in broken-lines, register with the perforation 158 for the reception of a locking pin (not shown). In transit, the dependent elements are folded, as shown in solid-lines, closely to underlie the frame elements 30, and their feet are retained by clip or bracket means 160.

The leg unit 152 is journalled to swing bodily about a horizontal, transverse axis defined by the brackets 150 and preferably disposed in a common horizontal plane with the axes defined by the brackets 171 which are equivalent to the brackets 98 of FIG. 1.

When it is desired to dismount the carrier in this form of the invention, the feet 155 are disengaged from the retaining brackets 160 and the leg unit 152 is swung in a counterclockwise direction as viewed in FIG. 9. Then, the dependent members of said leg unit are straightened about the hinge axes 156 and the extensions 157 are locked to the sections 153. Now, the feet 155 are dropped to the ground so that the leg members occupy substantially the broken-line position, inclining downwardly and rearwardly from the axis defined by the brackets 150. Now, the members 172 of the leg unit 170 are disengaged from the brackets 102 and are manipulated, through the ball mounting 92 and the hinge 88 in the manner above described, to straddle the vehicle body and occupy the downwardly and rearwardly inclined position shown in broken-lines. The front and rear leg units are so proportioned and designed that, when they are in the broken-line positions of FIG. 9, their portions 153 and 172 will be approximately parallel.

Now, the securing means 46, 48 and 50 will be released, and the vehicle will be driven slowly backwardly. The feet 155 and 173 will dig into the ground (or, if necessary or desired, they may be suitably blocked against rearward movement (and as the vehicle bumper 38 pushes against the pad 44, both leg units will be turned in a clockwise direction about their points of engagement with the ground to lift the brackets 150 and 171, and therefore the carrier, to a level above the top of the vehicle. With the dependent portions of both leg units in vertical position, of course the carrier will be self-supported, and the vehicle may be driven forwardly quite independently of the carrier.

When it is desired to remount the carrier on the vehicle, the vehicle will be driven backwardly between the dependent portions of the leg unit 170 until its bumper 38 is substantially in contact with the pad 44. Now, the bracket 50 is engaged with the bumper 38 and tightened; and as the vehicle is driven forward, the leg units will move toward their broken-line positions and the carrier will drop into supported position on the vehicle. Preferably, the parts will be so proportioned and designed that, in the self-supported position of the carrier, the rollers 52 or other supporting means will be only an inch or two above the vehicle top. It is important, of course, that the effective lengths of the front and rear leg units, particularly in this form of the invention, shall be substantially equal and shall somewhat exceed the distance by which their transverse axes are spaced above the surface on which the vehicle rests, when the carrier is supported upon the vehicle.

I claim as my invention:

1. A vehicle top carrier comprising a carrier body having a bottom and upstanding sides, a plurality of supports secured to said bottom and depending therefrom, each of said supports being evenly spaced-apart from each other over a portion of said bottom adjacent to one end of said body, and having a surface which cooperates with the surfaces of the other of said supports generally to define a shape conforming to the top of a vehicle thereby adapting said one end to be supported by a vehicle, a first pair of legs having first and second portions which are straight and rigidly joined in end to end relationship at an elbow thereby providing a first and second distal end of said portions respectively, each of said first leg portions having a base plate secured generaly perpendicularly to the axis thereof at said first distal end and a first hinged joint intermediate said first distal end and said elbow, said first joint having a first axis and a first means secured adjacent thereto for limiting hinged movement to one hundred eighty degrees, said second leg portions being hingedly secured together at said second distal ends by a second hinged joint thereby forming a U-shaped leg structure, said second hinged joint having a second axis which is parallel to said first axis, a pair of balls having a pair of diametral openings therethrough slidably positioned on said second leg portions adjacent said elbow, second means positioned on both sides of said balls and secured to said second leg portions for limiting the sliding movement of said second leg portions diametrically of said balls, said balls of said leg structure being swivelly secured to said body at opposite portions of said sides and at a position spaced from said bottom and adjacent said one end thereby positioning said second portions within said body and adapting said first leg portions to depend from said body in spaced-apart relation to the opposite sides of a vehicle on which said body is adapted to rest, said opposite portions being spaced-apart a distance less than the vehicle sides, said first joints being movable from a first position in which said first leg portions on opposite sides of said first joints are aligned away from each other to a second jack-knife position, each of said legs being swivelly movable about the centers of said balls and laterally movable toward and away from each other and said sides of said body, said lateral motion being in conjunction with hinged movement at said second joint, the movement of one said legs causing in the other of said legs a corresponding movement, said corresponding movement being a movement in the same direction when said movement is a swivel movement in planes parallel to said axes and being a movement in the opposite direction when said movement is accompanied by a hinged movement, said first pair of legs being swivelly movable from a first body-supporting position to a second retracted position adjacent said walls of said body, a second pair of legs secured to said carrier body adjacent the other end thereof, said second pair of legs being selectively movable from a first body-supporting position to a second retracted position, second means for adapting said body to be supported by the vehicle at said other end, third means for securing said body to a vehicle, said legs in said first positions cooperating to support said body so as to allow a vehicle to be driven beneath said body, thereby providing means for mounting and demounting said body to a vehicle.

2. The vehicle top carrier of claim 1 wherein said supporting devices comprise cylindrical rollers secured to said bottom adjacent both sides of said body and having axes of revolution which if extended would intersect said bottom and the axis of another roller, said intersecting axes defining planes which are perpendicular to said bottom and sides of said body and spaced-apart and parallel to each other.

3. The vehicle top carrier of claim 1 wherein said supporting devices comprise a plurality of feet swivelly supported on said bottom adjacent both sides of said body, each of said feet having an outwardly facing padded surface, said feet being selectively movable to allow said surfaces to conform generally to the shape of the top of a vehicle and being selectively securable when in the shape of the vehicle top.

4. The vehicle top carrier of claim 1 wherein said second pair of legs comprise a pair of jacks secured to said body and being movable from a retracted position to a position in which said other end of said body is lifted from the vehicle on which it rests, said jacks having a common actuating mechanism including a foot pedal located intermediate said jacks.

5. A vehicle top carrier comprising a carrier body having a bottom and upstanding sides, a plurality of supports secured to said bottom adjacent one end thereof and depending therefrom, each of said supports having a surface which cooperates with the surfaces of the other of said supports generally to define a shape conforming to the top of a vehicle thereby adapting said body to be supported by a vehicle, a U-shaped leg structure having a pair of generally parallel portions with distal ends, a pair of spaced-apart elbows intermediate said distal ends and a hinged joint intermediate said elbows, said leg structure being swivelly and slidably connected to opposite portions of said sides of said body adjacent to and between said elbows, said leg structure portions being jointed intermediate said elbows and said distal ends so as to be selectively movable from a substantially straight and parallel position outwardly in a jack-knife manner, said leg structure portions being laterally movable with respect to said sides of said body in conjunction with hinged movement at said hinged joint, the movement of one of said legs causing in the other of said legs a corresponding movement, said leg structure being swivelly movable from a first body-supporting position to a second retracted position, a second pair of legs secured to said carrier body adjacent the other end thereof, said second pair of legs being selectively movable from a first body-supporting position to a second retracted position, second means for adapting said body to be supported by a vehicle at said other end, third means for securing said body to a vehicle, said legs in said first positions cooperating to support said body so as to allow the vehicle to be driven beneath said body, thereby providing means for mounting and demounting said body to a vehicle.

6. A vehicle top carrier comprising a carrier body having a bottom and upstanding sides, a plurality of supports secured to said bottom adjacent one end thereof and depending therefrom, each of said supports having a surface which cooperates with the surfaces of the other of said supports generally to define a shape conforming to the top of a vehicle thereby adapting said one end to be supported by a vehicle, a first pair of legs having first and second portions which are straight and rigidly joined in end to end relationship at an elbow, each of said first leg portions having a first hinged joint intermediate one end and said elbow, said leg portions being hingedly secured together by a second hinged joint at the other end thereby forming a U-shaped leg structure, said leg structure being swivelly secured to said body at opposite sides thereof, thereby positioning said second portions within said body and adapting said first leg portions to depend from said body in spaced-apart relation to the opposite sides of a vehicle on which said body is adapted to rest, said first joints being movable from a first position in which said first leg portions on opposite sides of said first joint are aligned away from each other to a second jack-knife position, each of said legs being swivelly movable about the point at which the axes thereof intersect said sides from a first body-supporting position to a second retracted position adjacent said sides and laterally movable toward and away from each other and said sides of said body, said lateral motion being in conjunction with hinged movement at said second joint, the movement of one of said legs causing in the other of said legs a corresponding movement, a second pair of legs secured to said carrier body adjacent the other end thereof, said second pair of legs being selectively movable from a first body-supporting position to a second retracted position, second means for adapting said body to be supported by the vehicle at said other end, third means for securing said body to a vehicle, said legs in said first position cooperating to support said body so as to allow the vehicle to be driven beneath said body, thereby providing means for mounting and demounting said body to said vehicle.

References Cited by the Examiner

UNITED STATES PATENTS

| | | | |
|---|---|---|---|
| 1,049,210 | 12/1912 | Cole | 214—515 X |
| 2,357,203 | 8/1944 | Jimmes | 224—42.1 |
| 2,907,483 | 10/1959 | Prag | 214—450 |
| 3,164,371 | 1/1965 | Royle | 214—515 X |
| 3,185,518 | 5/1965 | Zentner | 214—515 X |

HUGO O. SCHULZ, *Primary Examiner.*